United States Patent [19]

Richard

[11] Patent Number: 4,533,038
[45] Date of Patent: Aug. 6, 1985

[54] CONVEYOR FOR OBJECTS TREATED WHILE CONTINUOUSLY IN MOTION

[75] Inventor: Jacques R. Richard, Cachan, France

[73] Assignee: Manufacture de Machines du Haut-Rhin, Mulhouse, France

[21] Appl. No.: 399,801

[22] Filed: Jul. 19, 1982

Related U.S. Application Data

[63] Continuation-in-part of Ser. No. 917,575, Jun. 21, 1978.

[30] Foreign Application Priority Data

Jun. 22, 1977 [FR] France ................. 77 19197

[51] Int. Cl.³ ............................... B65G 17/26
[52] U.S. Cl. ...................... 198/646; 198/656
[58] Field of Search ............ 198/656, 646, 655, 793

[56] References Cited

U.S. PATENT DOCUMENTS

| | | | |
|---|---|---|---|
| 1,651,925 | 12/1927 | Marsh | 198/655 |
| 2,189,587 | 2/1940 | Lallement | 198/655 |
| 2,943,727 | 7/1960 | Krupp et al. | 198/646 |
| 3,530,971 | 9/1970 | Babunovic | 198/655 |
| 3,730,331 | 5/1973 | Goldberg | 198/793 |
| 3,800,937 | 4/1974 | Tassie | 198/793 |
| 3,941,237 | 3/1976 | MacGregor, Jr. | 198/655 |
| 3,983,986 | 10/1976 | Allard | 198/793 |
| 3,983,990 | 10/1976 | Gardy et al. | 198/655 |
| 4,266,656 | 5/1981 | Richard | 198/655 |

FOREIGN PATENT DOCUMENTS 7017433  6/1972  Netherlands .................. 198/655

*Primary Examiner*—Joseph E. Valenza
*Assistant Examiner*—Daniel R. Alexander

[57] ABSTRACT

Conveyor for transporting an object particularly for use in a system which treats objects while they are continuously in motion. The conveyor is made up of carriers which are combined with other carriers to form an endless chain for carrying the objects to be treated from one work station to another. Each carrier is connected to a similar carrier with at least a degree of freedom of turning of one carrier with respect to its neighbor or neighbors about the longitudinal axis of the conveyor chain whereby the conveyor can be gradually twisted or turned to be inverted in its travel. Each carrier is provided with a housing having guides for retaining an object within the carrier.

8 Claims, 17 Drawing Figures

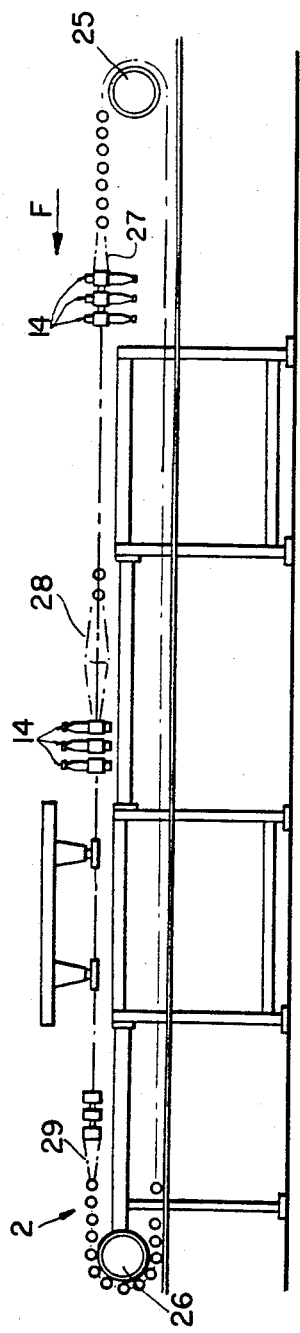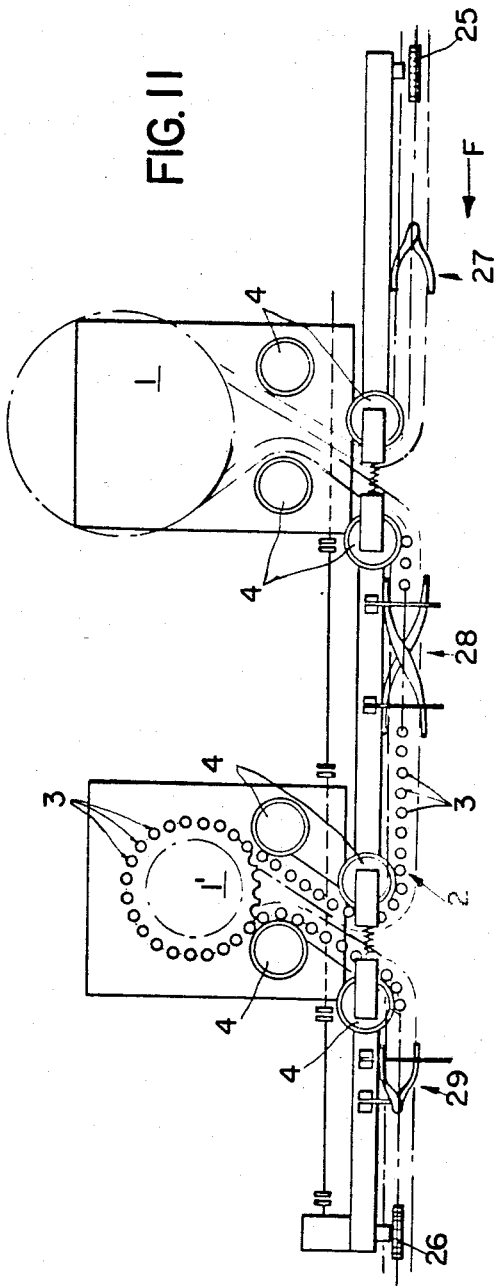

FIG. 13a
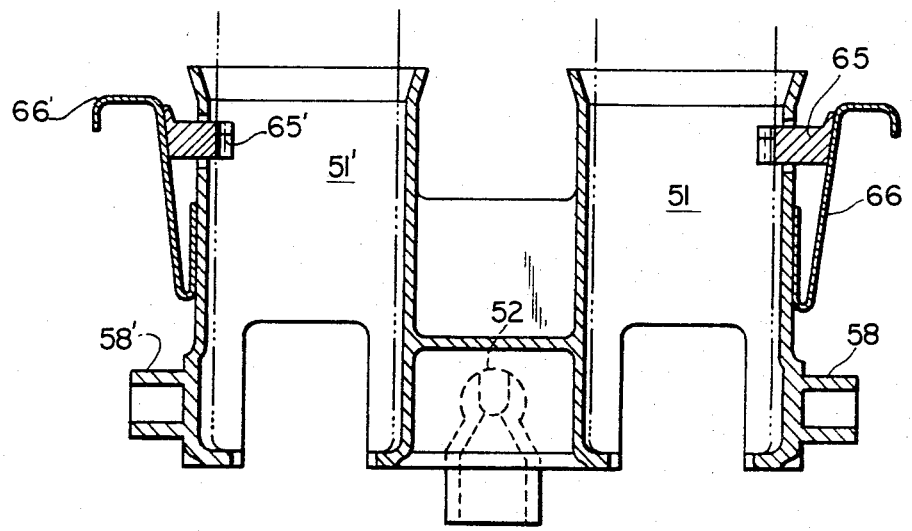
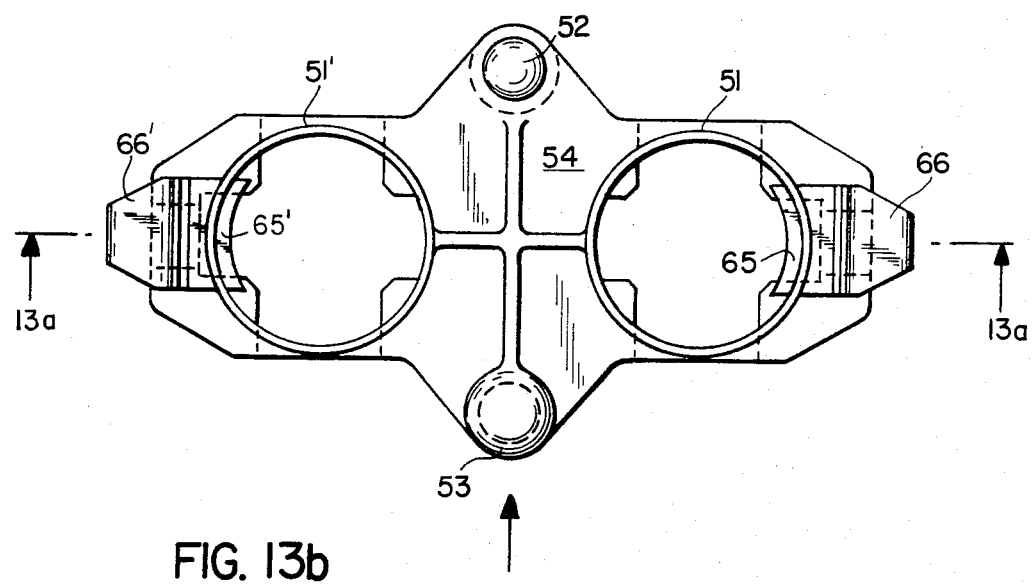
FIG. 13b

CONVEYOR FOR OBJECTS TREATED WHILE CONTINUOUSLY IN MOTION

This is a continuation-in-part of application Ser. No. 917,575, filed June 21, 1978.

This invention relates to a carrier for an object, particularly for use in an apparatus for treating a plurality of objects while they are continuously in motion, the carrier being adapted to be combined with other similar carriers to form a continuous conveyor chain for carrying the objects to be treated from one working position or station to another of such apparatus.

To assure the carrying of objects through treating installations, particularly in installations denominated "continuously moving apparatus", in which the treating operations are carried out during tha movement of the objects travelling at a uniform speed, it is known to dispose the objects to be treated in "vehicles" or carriers or carriers which are connected to each other to form an endless chain which serves the entire installation or a part of it. Such arrangements are known, and are disclosed, for example, in French Pat. No. 2,250,692.

However, such continuous chains of carriers have a number of different disadvantages, one of the most important of which is that the orientation of the carriers with respect to each other can be altered only in a single plane. For example, in a continuously moving apparatus or machine in which the chain of connected carriers pass one after the other around operational drums upon which the treating operations to which the objects are subjected take place, the orientation of the carriers with respect to each other can be modified only in a plane perpendicular to the axes of the drums. In other words, if the axes of the drums are vertical, the chain formed by the carriers in the carriers are bottles, placed upright in the carriers, this means that the bottles cannot be inclined or turned upside down without being removed from the carriers. This is an inconvenience, particularly in the case of draining of the bottles, in which it is necessary to invert them. Furthermore, such known chains of object carriers are in general of complex construction and are heavy and costly.

The invention has among its objects the provision of a carrier which holds in a centered accurate manner an object to be treated and which permits the carrier and the object held therein to be turned through 180 degrees around a horizontal axis, the object being securely held in the carrier throughout such operation.

To this end, the first embodiment of the invention relates to an object-transporting carrier, particularly for use in an installation in which the objects travel continuously while being treated, the carrier being adapted to be combined with other similar carriers to form a continuous chain passing through the installation to carry the objects to be treated from one work station to another, the carrier having a connecting means adapted to connect two consecutive carriers with at least a degree of freedom or tipping of one carrier with respect to the other about the direction or axis of their travel and by having a receptacle provided with guiding means and an object retaining means adapted to hold an object introduced into the carrier.

The carriers according to the invention may be assembled into a chain for transporting objects which are to be tipped, during such tipping the objects remaining retained in the carriers and centered without the possibility of their escaping therefrom.

It is particularly important that the object retaining means shall include object guiding means for accurately locating the objects in their respective carriers; this is particularly important in the case in which the objects are in the form of bodies of revolution and are of cylindrical shape, such as bottles. In effect, if the retaining means are not spaced regularly around the periphery of the receptacle on the carrier, as when it is provided with only one or two retaining means, it is necessary to supplement them with a guiding means. In the case of a single retaining means, it is necessary to provide two guiding means, since the cylindrical object engages the receptacle only along a generatrix which is insufficient for the secure holding of the object. In addition, the object will otherwise not be centered or located in the carrier.

In accordance with another feature of the first embodiment of this invention, there is provided a means for connecting consecutive carriers in a flexible manner.

In accordance with a still further feature, the connecting means is constituted by a first member having a rounded head, as well as a second member directly opposed to the first member, such second member having a round socket, the head of the flexible member fitting within and being encompassed by the round socket, of the carrier which is directly adjacent thereto.

It is particularly advantageous to make the carrier a single piece, for example, by molding it from a synthetic resin. The interlocking connecting means is particularly practical since the forces to which the carrier is subjected are small. In effect, by snapping the head of a connecting member into the rounded receptacle therefor, one may easily connect successive carriers together or disconnect them from the chain to adapt the chain of carriers to different pieces or objects to be treated, the receptacles of the carriers being by preference adapted to the form and the dimensions of the pieces or objects to be treated.

The present invention in second and third embodiments thereof has among its objects the provision of a carrier which is an improvement over that above briefly described, the second and third embodiments of the carrier of the invention permitting a considerable speeding-up of production by a machine provided with such carrier.

To attain such object, the second and third embodiments of the carrier of the present invention include two object-receiving cavities having parallel axes, such cavities being symmetrical with respect to a plane passing through the axes of the ball and the recess receiving the ball of the means connecting successive carriers, said two compartments being connected to each other by a flange which is preferably provided with stiffening ribs, the parts of the carrier providing the two compartments which may include means for guiding and retaining the objects introduced into the respective compartments, the two-cavity carrier also including means for driving a chain composed of such carriers. Such driving means includes a cylindrical projection, coaxial with the ball of the joint, and extending from the flange in a direction opposite that of the ball, the other part of the connecting means including a cavity in the flange adapted to receive the ball of the next adjacent carrier in the chain. Each of the carriers includes laterally, oppositely, outwardly directed trunnions, the axes of the trunnions being disposed in the plane of symmetry of the two compartments of the carrier.

The invention will be described in further detail upon referring to the attached drawings, in which:

FIG. 10 is a schematic view in elevation of a system for the continuous treatment of objects, such system being provided with a chain of vehicles in accordance with the invention;

FIG. 11 is a schematic view in plan of the installation shown in FIG. 10;

FIGS. 13a and 13b are, respectively, a view in section along the plane passing through the axes of the two compartments of a carrier in accordance with a third embodiment of the invention, and a view in plan of such third embodiment of the carrier, the section of FIG. 13a being taken along the plane 13a—13a in FIG. 13b;

Figure 14:
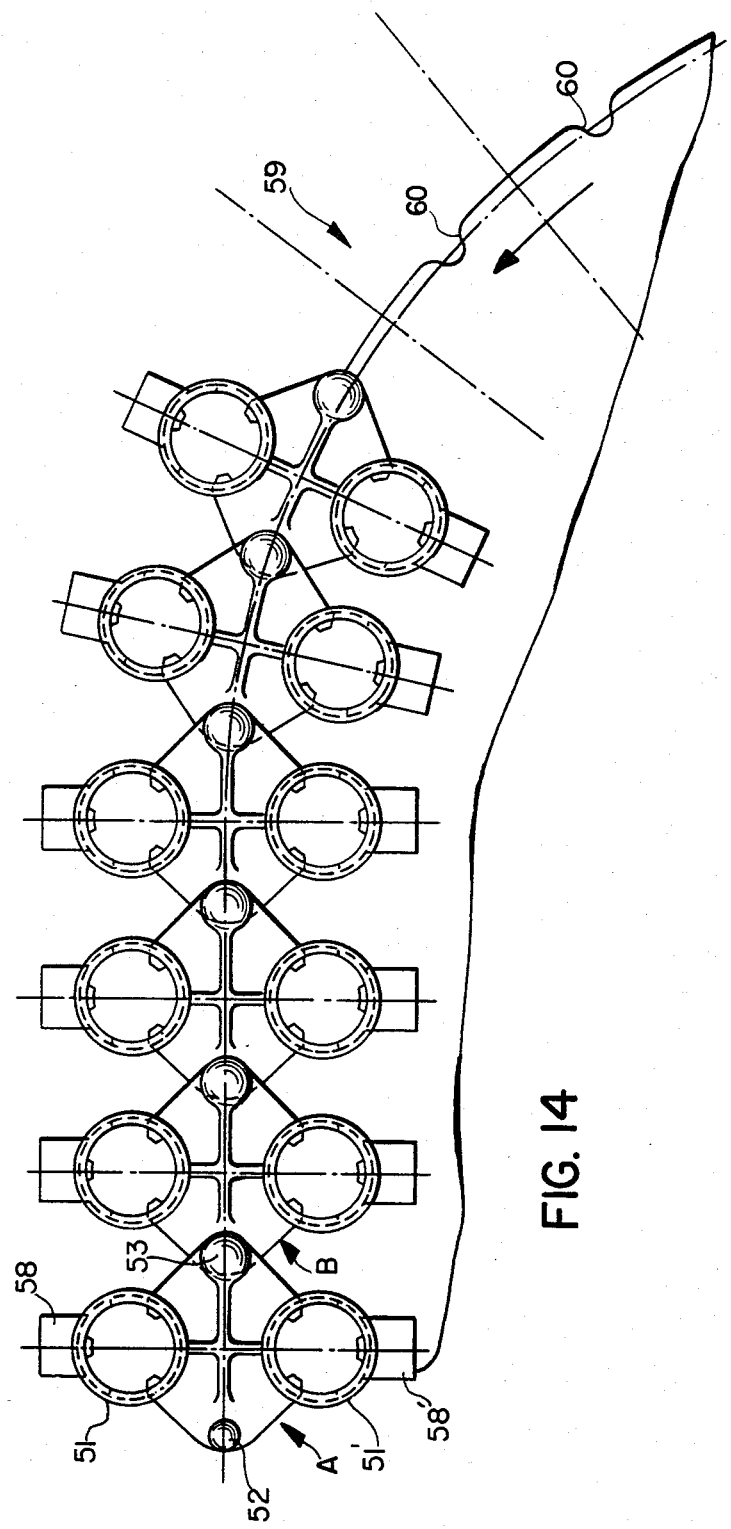
Figure 15:
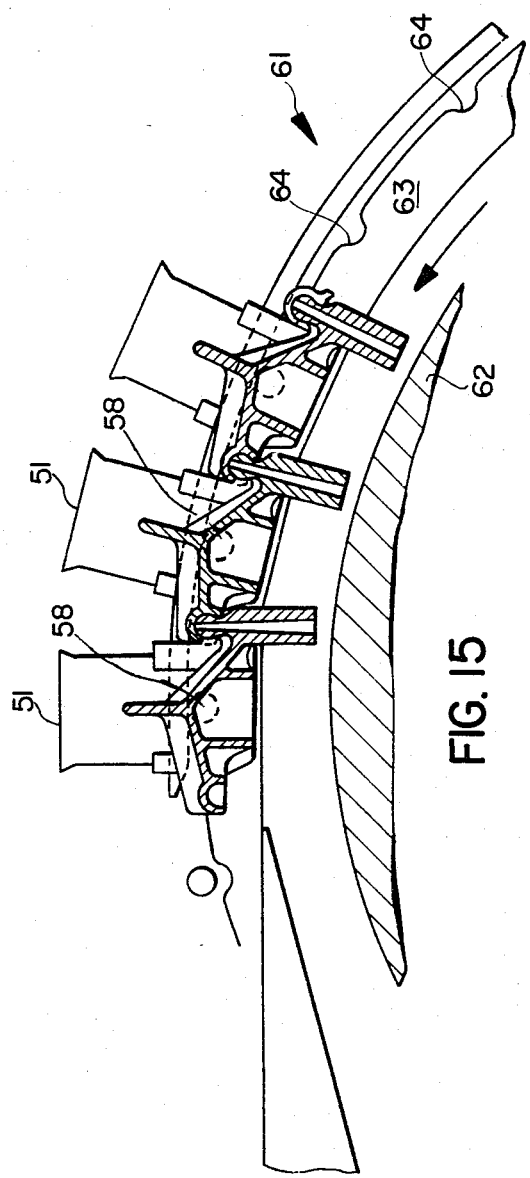

FIG. 14 is a fragmentary view in plane of a chain of carriers in accordance with the second embodiment of the invention, the chain of carriers passing around a wheel having an axis parallel to the axes for the compartments in the carriers; and FIG. 15 is a fragmentary view partially in side elevation and partially in vertical section through a chain of carriers in accordance with the second embodiment of the carrier, the chain passing around a wheel having an axis perpendicular to the axis of the compartments of the carriers.

Figure 1:
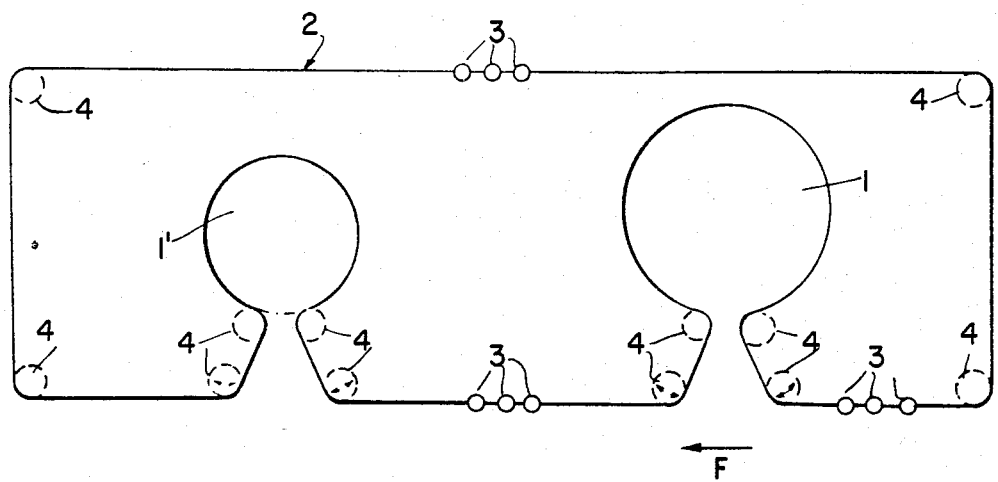
FIG. 1 is a schematic view in plan of an installation for treating articles while they are continuously in motion, the installation provided with a chain of carriers which can be curved only in a horizontal plane, such figure being labeled "PRIOR ART"

FIG. 1 shows schematically in plan a prior art installation for the continuous treatment of objects, such installation being provided with a chain 2 of object carriers of a known type, such chain being able to be bend or curved only in a horizontal plane. In the example shown, the installation comprises a first operating drum 1 and a second operating drum 1'. The continuous chain 2, constituted by an assembly of carriers 3, of which only certain ones are shown in the figure, pass around two operating drums 1 and 1' and around a certain number of return guide rolls 4, travelling with a uniform movement in the direction of the arrow F and carrying bottles disposed in the carriers 3 around the operating drum 1 and then around the operating drum 1'. The placing of the bottles in the carriers 3 is carried out by means (not shown) operated either manually or automatically, such means being located upstream of the drum 1, the bottles being discharged from the carriers downstream of the drum 1'. In their travel around the drum 1, the bottles are treated, for example, by being filled, and in their travel around the drum 1' the bottles are, for example, capped or closed.

The distance of a system such as that shown in FIG. 1 and above described is that the bottles, over the whole of their travel, are maintained upright in the carriers, with their openings disposed upwardly, that is, the bottles cannot be either tipped or turned upside down. This inconvenience is great in certain cases. For example, if before the filling of the bottles, the bottles are to be rinsed and drained with their openings turned downwardly, it is possible to carry out such operations only upon a supplemental operating drum disposed upstream of the operating drum 1 in the installation of FIG. 1, and the rinsing or the draining must of necessity be carried out in a separate and distinct mechanism with all the inconveniences which this entails, including investments and the costs of supplemental manual labor.

Further, in the case of chain of carriers which may be curved only in a horizontal plane, as in FIG. 1, the run of the chain passing about the operational drums 1 and 1' and the return run of the conveyor are forcibly disposed in the same horizontal plane, which entails a fundamental disadvantage.

In order to remedy such inconveniences, the present invention provides novel object-carriers and means permitting the assembly of such carriers into a chain such that the carriers may be oriented one with respect to the other in different planes.

Figure 4:
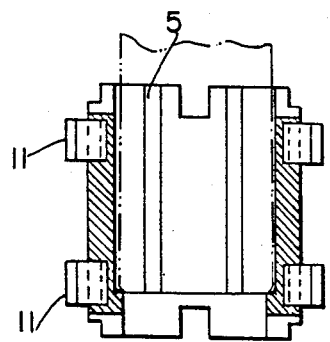
FIG. 4 is a view in vertical axial section taken along the broken section line 4—4 in FIG. 2.
Figure 3:
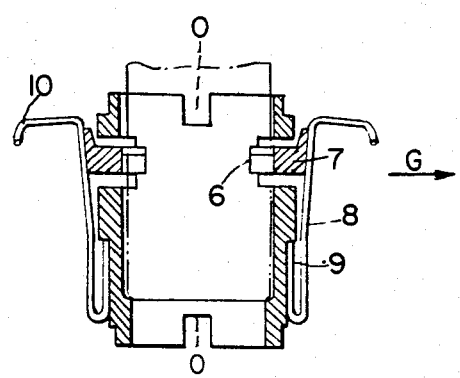
FIG. 3 is a view in vertical axial section taken along the line 3—3 in FIG. 2
Figure 2:
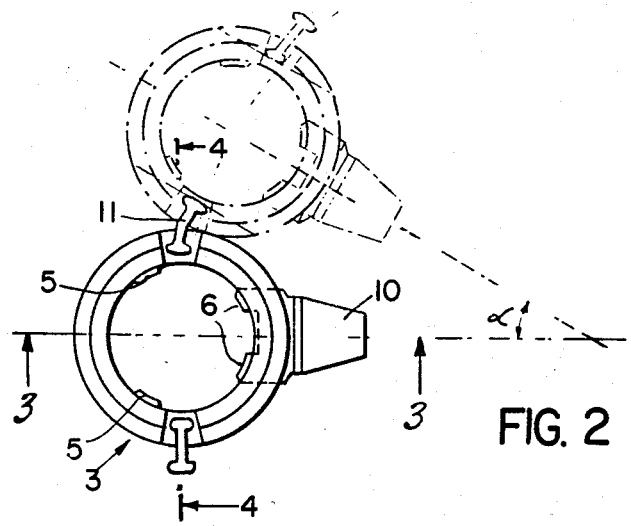
FIG. 2 is a view in plan of a first embodiment of carrier in accordance with the invention.

Referring now to FIGS. 2, 3 and 4, there are there shown a first embodiment of object carrier in accordance with the invention. The carrier 3 has an annular structure preferably formed by molding a material such as a plastic material. In the central cavity of such annular structure, vertical ribs 5 and 6 guide a bottle placed into the carrier. In order that the bottle may be maintained without slipping in the cavity of the carrier, the ribs 6 are carried upon a wedge 7, the wedge being thrust radially inwardly of the cavity of the carrier by a leaf spring 8 bent upon itself, one end of the spring being riveted at 9 to the wall of the carrier. The spring 8 pushes the wedge 7 and the two ribs 6 attached thereto (FIG. 2) radially inwardly to the axis 0—0 of the carrier (FIG. 3). To introduce a bottle into the carrier, it is necessary to move the wedge 7 radially outwardly by pulling the end 10 of the spring 8 radially outwardly in the direction of the arrow G, then, the bottle having been introduced into the cavity of the carrier, the spring 8 is released so that it carries the wedge 7 radially inwardly, the wall of the bottle then being engaged by the two ribs 6 on the wedge 7 and by the two spaced fixed ribs 5 on the internal wall of the cavity in the carrier. The pulling of the hook on end 10 of the spring and its subsequent release may be performed by mechanism (Not shown) similar to that shown in the co-assigned Richard U.S. application Ser. No. 884,280, filed Mar. 7, 1978. At the side of the carrier which is shown in full lines in FIG. 2, there is shown in phantom lines a second carrier of the chain, which is connected to the first carrier by flexible connecting elements 11.

These flexible connecting elements permit the turning of the two vehicles with respect to each other in a plane perpendicular to their vertical axes, as can be seen in FIG. 2, where the two carriers form between them an angle which can be on the order of 30 degrees. These flexible connecting elements also, at the same time, permit although to a small degree, the modification of the orientation of the two vehicles relative to each other in other planes. For example, if in a chain formed by such carriers the carriers are present in a number n, and the bottles which they contain are vertical, it is possible to give to the carrier in the span n+1 a small inclination, on the order of 5 degrees, with respect to the vertical. Such inclination translates into opposite oblique positions of the flexible element 11 at those positions thereof lying at the upper (FIG. 2) and the lower (FIG. 2) flexible element 11 with respect to a vertical plane passing through the position of such elements. In also translates to light torsion of the two flexible connecting elements connected to the carriers in the span n and n+1. By the same token, the carrier in the position n+2 can itself be slightly inclined, by 5 degrees for example, with respect to the carrier in the position n+1, and thus is inclined by 10 degrees with respect to the carrier in the position n, and so on, so that the carrier in the position n+32 may have been turned through 180 degrees with respect to the carrier in position n, so that the bottle which it contains will now be in an inverted vertical position, with the head in the lower position and the opening in the upper position if the bottle held by the carrier at the position n was initially placed in position n with its head uppermost. Thus, with the chain formed of carriers as shown in FIGS. 2, 3 and 4, it is possible to return the bottles to their original positions.

There will now be described the putting in place of a bottle 14 in a carrier and introducing the bottle from the bottom. It is abundantly evident that one may also introduce the bottle by the neck to lead it initially into position such as that shown in FIG. 9; then subsequently into the position shown in FIG. 8.

Figure 5:
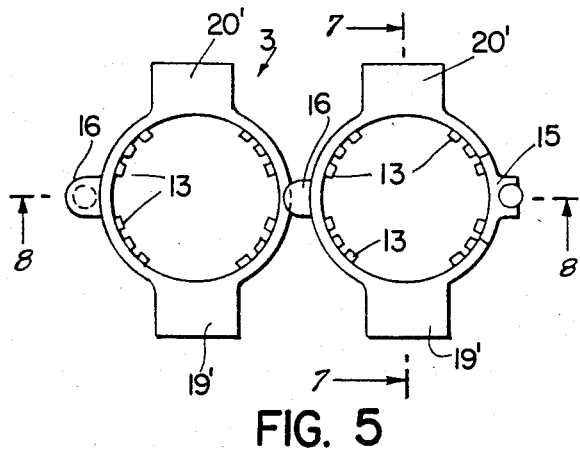
FIG. 5 is a view in plan of two connected carriers constructed in accordance with a second preferred embodiment according to the invention.

However, the solution which is now to be described presents the inconveniences of requiring a length of chain which is relatively great (corresponding for example to 36 carriers) to obtain the re-turning of the bottles. That is why the second embodiment, which will now be described in connection with FIGS. 5 and 6, is preferred.

Figure 8:
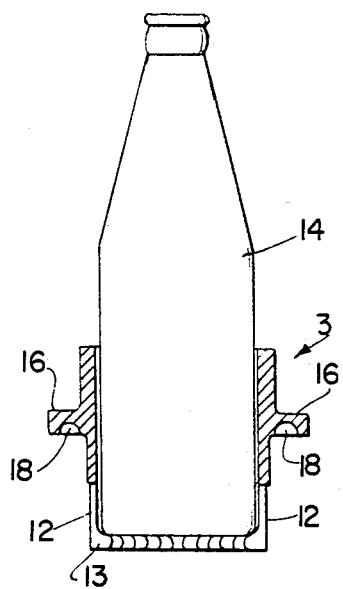
FIG. 8 is a view in section taken along the line 8—8 in FIG. 5, the view showing an object, in this instance a bottle, supported upon the roots or heels of tongues of a carrier.
Figure 9:
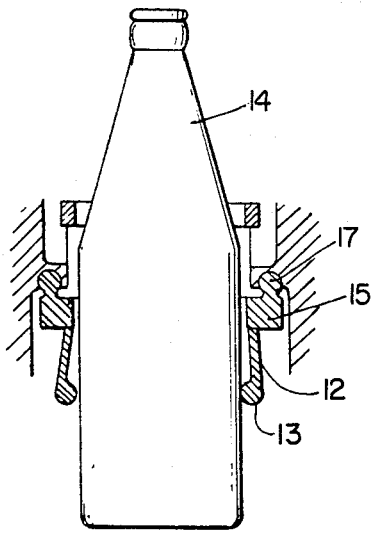
FIG. 9 is a view similar to FIG. 8 but showing a bottle in a lowered position in which it is retained on the carrier by the tongues.

In such second embodiment, the carrier 3 also presents a structure in the form of an annular assembly, obtained by preference by molding from plastic material having a certain desired elasticity ans flexibility, such as polyamide or an acetal resin. Also the wedge 7 provided on the carrier of FIGS. 2, 3 and 4 to avoid the slipping of the bottle with respect to the carrier is not employed here. It is replaced by a plurality of elastic tongues 12, provided at their lower ends with a rim of projections 13 extending towards the interior of the carrier. FIGS. 8 and 9 show two axial positions which a bottle 14 may occupy, among others, in the carrier. Such bottle 14, oriented vertically with the bottom downwardly is introduced into the carrier 3 through the upper opening in it. Such introduction may be carried out without difficulty, the interior diameter of the cavity in the carrier 3 being at least slightly greater than the exterior diameter of the bottle 14. The weight of the bottle 14 causes it to repose stably upon the rim made up of the shallow fingers 13 on the tongues 12, in a way there shown in FIG. 8, since the diameter of the cavity in the carrier outlined or included by the projection 13 is less than the external diameter of the bottle 14. The bottle 14 then finds itself in the position shown in FIG. 8.

If one then exerts upon the bottle a sufficient force directed vertically downwardly, the bottom of the bottle then escapes from the shallow projections or fingers 13 as the tongues 12 are elastically deformed, as shown in FIG. 9, and the bottle can then decend, for example, to the position shown in FIG. 9. In such position, and also when the carrier and bottle are inclined, the bottle is held by friction without being able to slide, between the shallow fingers 13 forcibly applied to the wall of the bottle by the elastic deformation of the tongues 12.

Figure 6:
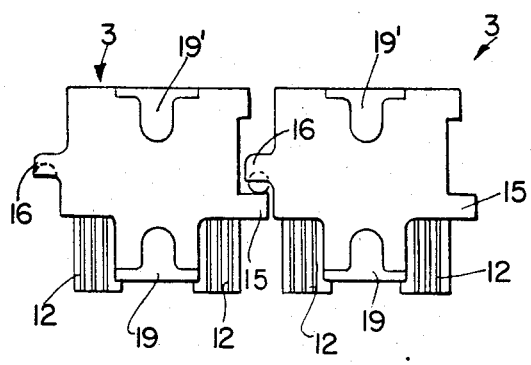
FIG. 6 is a view in elevation of the two connected carriers shown in FIG. 5, the view being taken in a direction perpendicular to the direction of travel of the chain.

FIG. 6 also shown the manner of connection of consecutive carriers 3 in the second embodiment. Each carrier comprises a first fitting 15 and a second fitting 16, fittings 15 and 16 being diametrically opposed on the carrier. Fitting 15 carries a round head 17 and the fitting 16 has a cavity therein for the reception of the head 17. The cavity 18 corresponds to a little more than a half sphere, so that the head 17 of the means connected to the adjacent carrier may be snapped thereinto, as shown in FIG. 9 which shows two consecutive adjoining carriers which form a part of a chain. the fact that the carriers are made in the form of a single molded piece as shown in FIGS. 5 and 6 from elastic plastic material permits the head 17 to be introduced into the cavity 18 by the application of a relatively light pressure thereto.

The assembly attained between two consecutive carriers provided with heads and encircling cavities into which they are introduced according to FIGS. 5, 8 and 9 give to such carriers a liberty of relative orientation which is much greater than that of the preceding embodiment described in connection with FIGS. 2, 3 and 4. It is thus that, if the carrier and the bottle in the position n+1 may be inclined with respect thereto by at least 15 degrees, so that one may obtain a complete turning of the bottle through 180 degrees by use of only 12 carriers in place of the 36 carriers employed in the embodiment shown in FIGS. 3 and 4.

Each of the carriers in accordance with FIGS. 5–9, incl., comprises, in a diametrical plane perpendicular to that of fittings 15 and 16, two diametrically opposed sets of lower and upper ears 19, 19′, and 20, 20′. These ears serve essentially to guide the chain of carriers during its travel, as upon guiding rails 21 and 22 (FIG. 7) upon which the ears 19 and 20 are supported, or in cooperation with the guiding rails 23 and 24 passing, respectively, between the ears 19 and 19′ and the ears 20 and 20′. The use of one or the other of two types of guiding rails will be explained below.

FIGS. 10 and 11 schematically illustrate an installation of a continuously moving equipment provided with a chain of object carriers according to the invention, FIGS. 10 and 11 showing apparatus employing carriers such as those shown in FIGS. 5-9, inclusive. The reference characters employed in FIG. 1 are repeated here for parts of the installation which are similar to those of FIG. 1. The installation shown in FIGS. 9 and 10 is essentially comprised of two operating drums 1 and 1′ successively served by an endless chain 2 composed of carriers 3 containing bottles 14. Such chain travels in the direction of the arrow F.

In the embodiment shown, the drum 1 is a rinsing and draining drum to which the bottles travel in an upside down position, as shown at the right in FIG. 10 the carriers and bottles having been turned 90 degrees by helical guides 27 from a horizontal to an inverted position. the chain 2 is guided at the entrance and the exit of the operating barrel or drum 1 by return roller guides 4. At 28, the chain of carriers encounters a pair of rails in the form of semi-helices which correspond to the guiding rails 23 and 24 in FIG. 7, that is to say, they engage, respectively, between ears 19 and 19' and the ears 20 and 20' of each of the object carriers 3. Under the action of such semi-helical rails at 28, which twist through 180 degrees, the chain 2 is tipped and the bottles 14 pass from a reversed or upside down vertical position to an upright position in which they are treated in the operating drum 1' which is assumed in this example, to be a bottle filling and closing drum. It is to be understood that the path of the helices of the guiding rails at 28 is such as to return the bottles during the length of travel of the chain 2 corresponding to the length of 12 carriers.

At the drum 1' the bottles 14, now filled and closed, are removed from the carrier 3. Then the chain 2 again encounters at 29 quarter-turn helicoidal guiding rails which are the reverse of those at 27 and are similar to those situated at position 28 but extend through only 90 degrees rather than 180 degrees. The rails at 29 make the carriers 3 turn from the upright vertical position to a horizontal position, which allows the chain 2 to pass around a return guiding roll 26 having a horizontal axis and to have thus a lower return span of the chain 2 located below the upper entrance span and in the same vertical plane. Thus the system of this embodiment represents an important saving in space as compared to that shown in FIG. 1.

At the ends of its lower return run, the chain 2 passes around a return drum 25 having a horizontal axis, then it again encounters at 27 the above-described two guiding rails having helices turning through 90 degrees, which return the carriers 3 to an inverted vertical position. New bottles 14 to be rinsed and drained are then introduced into the carriers 3 either in horizontal positions upstream of helical guides 27 or in inverted position downstream thereof in advance of the first guide roll 4 at the left, and the above-described succession of operations is repeated.

Figure 7:
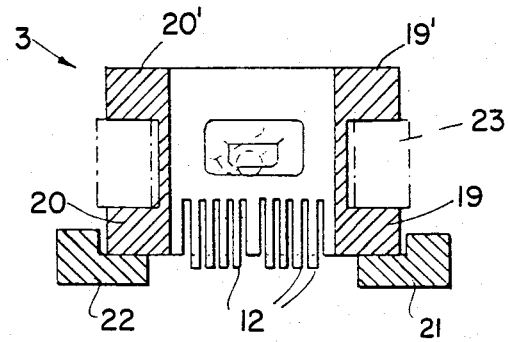
FIG. 7 is a view in section taken along the line 7—7 of FIG. 5, FIG. 7 showing one of the two carriers shown in FIG. 5.

All the parts of the chain of carriers which are not in contact with the helical guiding rails at locations 27, 28 and 29, or which are not supported by an operating drum or a return drum are guided and supported by straight rails of the type shown at 21 and 22 in FIG. 7.

Figure 12A:
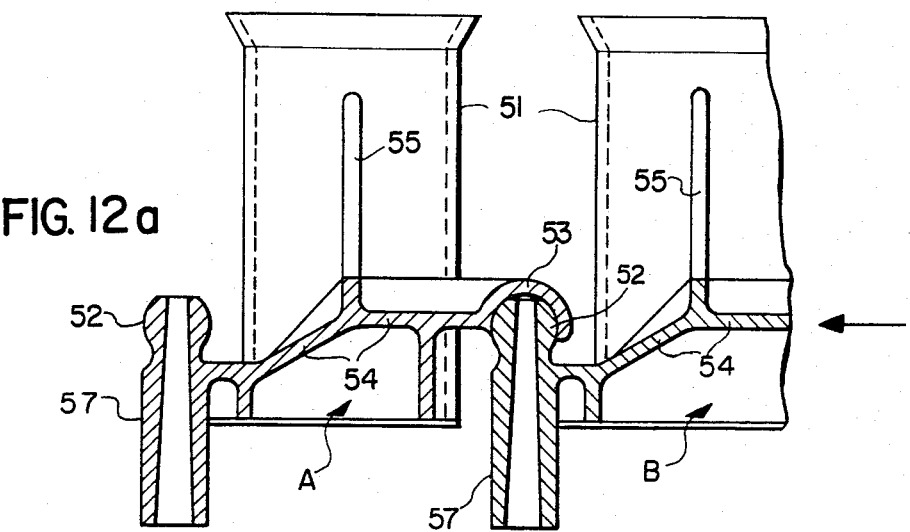
FIGS. 12a and 12b are, respectively, a view in section taken along the plane of symmetry of the two compartments of a carrier, and a view in plan of a second embodiment of a carrier of the invention, the section of FIG. 12a being taken along line 12a—12a in FIG. 12b.
Figure 12B:
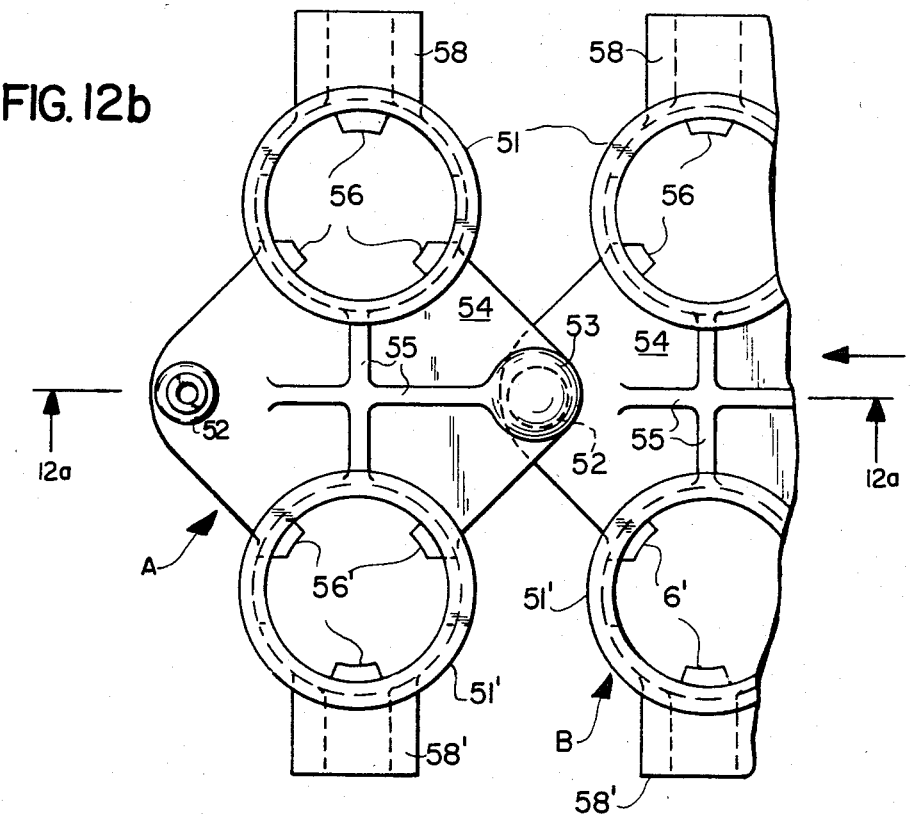

FIGS. 12a and 12b illustrate a second embodiment of carrier in accordance with the invention, such carrier being especially adapted to receive objects such as bottles. The carrier there shown has two upwardly open compartments or cavities 51 and 51'. . . , respectively, each adapted to receive a bottle, the compartments being disposed symmetrically with respect to a plane through the axes of the ball 52 and the cavity 53 which on successive carriers in a chain cooperate to connect the carriers together. Compartments 51 and 51' are connected by a flange 54 which is disposed perpendicular to the longitudinal axes of compartments 51 and 51', the axes of the compartments being parallel to each other and parallel to the axes of the ball 52 and the cavity 53. The flange is provided with stiffening ribs 55. Each of the compartments 51 and 51' include means 56 and 56', respectively, for guiding and retaining the object introduced therein, which in this particular case have for their objects the retaining of bottles positioned vertically in each of the compartments 51 and 51' of the carrier. A cylindrical projection 57 coaxial with a ball 52 and extending in the opposite direction from the flange 54 from the ball constitutes a first means for driving a chain made up of a plurality of the carriers. Other driving means are made up of two horizontally extending trunnions 58 and 58', such trunnions being coaxial and extending in opposite directions from the respective compartments 51 and 51', the common axis of the trunnions lying in the plane of symmetry of the compartments 51 and 51'.

As will be seen in FIGS. 12a and 12b, two consecutive carriers are connected to each other by the reception of the ball 52 of the carrier B into the cavity 53 of the carrier A. The engagement between the ball 52 and the cavity 53 extends over at least a little more than a half-sphere, the ball 52 being snapped into the cavity 53 by an elastic deformation of the elastic material of which the respective parts are made, so that there results a relatively secure assemblage of the two carriers.

FIG. 14 schematically illustrates the travel of a chain of carriers constituted by carriers made in accordance with FIG. 12a and 12b around a wheel 59 turning around a vertical axis parallel to the exes of the compartments 51 and 51' of the carriers, a portion of the periphery of the wheel being shown. Such periphery includes a plurality of spaced seats 60 with which the projections 57 and the balls 52 of the carriers interfit. Such relationship permits the driving of the chain of carriers as it passes around the wheel 59, which is driven by means not shown.

FIG. 15 illustrates a chain of carriers rolling about a wheel 61, only the periphery of the wheel being shown, the axis of rotation of wheel 61 being horizontal, that is, perpendicular to the axes of the compartments in the carriers. The wheel 61 includes a median part 62 (represented in FIG. 15 by a hatched circle), and two lateral flanks 63 of which only one is shown in FIG. 15, such figure being a section taken along the plane of symmetry of the wheel 61. The periphery of the flanks 63 is provided with recesses 64 in which the trunnions 58 of the carriers are received, thus permitting the driving of the chain of carriers as it turns about the wheel 61, which is driven by means not shown. In the preceding description, the carriers are adapted to receive bottles only when the carriers are in a vertical upright position, and so the bottle retaining means 56, 56' are disposed at the lower ends of said compartments and support the bottom of the bottles.

A third embodiment of carriers in accordance with the invention is shown in FIGS. 13a and 13b. Such embodiment of carrier permits a tipping of successive carriers with respect to each other and thus a twisting of the chain. Such embodiment of carrier may be employed in the above-disclosed conveyor system of FIGS. 1–11, incl., wherein the carriers in the chain are progressively turned upside down to permit rinsing of the bottles held therein, and are then turned right side up to dispose bottles held thereby in vertical postion preliminary to their being filled.

In FIGS. 13a and 13b the same reference characters employed in FIGS. 12a and 12b and designate similar parts performing the same functions. The carriers according to FIG. 13a and 13b differ essentially from those shown in FIGS. 12a and 12b in that each of the two compartments is provided with means for holding bottles therein in inverted position, such means being constituted by a wedge or cleat which is held against the wall of a bottle by a bent leaf spring 66 or 66'. The manner of operation of such bottle holder is described above in connection with FIGS. 1-11, inclusive.

As is the case with the carriers disclosed in FIGS. 1-11, incl., the second and third embodiments shown in FIGS. 12-15, incl., are by preference as a single piece of elastic plastic material such as a polyamide or an acetal resin. It is to be understood that the invention is not limited to the above-described embodiments thereof shown in the drawings and that they may assume other forms and other manners of realization, without departing from the scope of the present invention.

Although the invention is illustrated and described with reference to a plurality of preferred embodiments thereof, it is to be expressly understood that it is in no way limited to the disclosure of such preferred embodiments, but is capable of numerous modifications within the scope of the appended claims.

I claim:

1. An endless chain conveyor adapted to transport objects in an installation for treating them while they are in continuous motion, the conveyor being made up of a plurality of simlar open-topped carriers which carry objects to be treated from one station of the installation to another, the conveyor further comprising means for connecting each pair of consecutive carriers with at least a degree of freedom of tipping of one carrier with respect to another in a direction angularly about the direction of travel of the chain conveyer, conveyer drive means for cooperating with an external drive means, means for turning the chain conveyor gradually about a first axis which extends in the direction of travel of the chain conveyor to invert the chain conveyor including its carriers, said means for connecting each pair of consecutive carriers, and said conveyor drive means from their upright positions at a first location, and means for thereafter turning the entire chain conveyor gradually about a second axis parallel to the first axis to return the chain conveyor and the carriers to their upright positions.

2. A conveyor according to claim 1, wherein each of the connecting means is constituted by a first fitting in the form of a projecting member having a round head, a second fitting diametrically opposed to the first fitting, such second fitting having a round cavity with an extent somewhat exceeding a half-sphere, the head of the flexible member being disposed and secured within the cavity of the next adjacent carrier to form a flexible connection therebetween.

3. A conveyor according to claim 2, wherein each carrier comprises at least two pairs of guiding ears diametrically opposed and located in a diametrical plane perpendicular to that in which the fittings are located, and the conveyor comprises guiding rails extending along the path of travel of the carriers through the installation for engagement by said guiding ears on the carriers.

4. The conveyor according to claim 1, wherein each carrier comprises means adjacent the opposite ends thereof adapted to connect two consecutive carriers while providing at least a degree of freedom of turning of one carrier with respect to another during the travel of the chain, the carrier having two object-receiving cavities, the respective cavities being disposed on opposite sides of the vertical longitudinal plane passing through the connecting means adjacent the opposite ends of the carrier, the connecting means being constituted by two separate fittings on the carrier, the first fitting being in the form of a projecting member having a round head, and the second fitting having a round cavity with an extent somewhat exceeding a half-sphere, the head of the projecting member of the first fitting being adapted to be disposed and secured within the cavity of the second fitting of the next adjacent carrier to form a flexible connection therebetween.

5. The combination according to claim 4, wherein the carrier is molded in one piece of plastic material, such material being strong, elastic and flexible.

6. The combination according to claim 4, wherein each cavity is provided with object-guiding and retaining means constituted by an assembly of elastic tongues of which the free extremities terminate in shallow projections normally extending into the respective cavity, said projections being adapted selectively to grip the object transported by the carrier by frictional engagement with the side-wall thereof.

7. The combination according to claim 4, further including other driving means comprising a pair of diametrically opposed guiding and carrier driving means located in a diametrical plane through the two cavities on the carrier which is perpendicular to that in which the fittings on the carrier are located, such other carrier driving means being adapted drivingly to cooperate with said external drive means.

8. A driven endless chain conveyor according to claim 1, adapted to transport objects in an installation for treating them while they are in continuous motion in consecutive parallel runs, in a first run the carriers being in upright position and in a second run the carriers being in inverted position, the conveyor being made up of a plurality of similar carriers which carry objects to be treated from one station of the installation to another along a horizontal path, each part of the conveyor comprising two consecutive carriers while providing at least a degree of freedom of turning of one carrier with respect to another about a horizontal axis as well as about a vertical axis during the travel of the chain, each of the carriers having two upwardly open object-receiving cavities, the respective cavities being disposed on opposite sides of the vertical longitudinal plane passing through the connecting means being constituted by two separate fittings on the carrier, the first fitting being in the form of a projecting member having a round head, and the second fitting having a round cavity with an extent somewhat exceeding a half-sphere, the head of the projecting member of the first fitting being disposed and secured within the cavity of the second fitting of the next adjacent carrier to form a flexible connection therebetween.

* * * * *